United States Patent
Sriram et al.

(10) Patent No.: US 9,794,804 B2
(45) Date of Patent: Oct. 17, 2017

(54) CARRIER PRIORITY BASED AUTOMATIC NEIGHBORING RELATION OPTIMIZATION

(71) Applicant: Alcatel-Lucent USA Inc., Murray Hill, NJ (US)

(72) Inventors: Sundar R. Sriram, Aurora, IL (US); Kannan T. Konda, Aurora, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 141 days.

(21) Appl. No.: 14/855,519

(22) Filed: Sep. 16, 2015

(65) Prior Publication Data

US 2017/0078895 A1    Mar. 16, 2017

(51) Int. Cl.
*H04W 24/02* (2009.01)
*H04W 24/10* (2009.01)

(52) U.S. Cl.
CPC ........... *H04W 24/02* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 9,294,963 B2* | 3/2016 | Masini | H04W 36/0083 |
| 2009/0264130 A1* | 10/2009 | Catovic | H04W 36/0083 |
| | | | 455/436 |
| 2011/0028181 A1* | 2/2011 | Byun | H04W 36/0083 |
| | | | 455/525 |
| 2011/0294527 A1* | 12/2011 | Brueck | H04W 24/02 |
| | | | 455/466 |
| 2013/0109372 A1* | 5/2013 | Ekici | H04W 24/02 |
| | | | 455/422.1 |
| 2013/0130695 A1* | 5/2013 | Ryu | H04W 36/0083 |
| | | | 455/438 |
| 2013/0189976 A1* | 7/2013 | Kim | H04W 72/0406 |
| | | | 455/434 |
| 2015/0079990 A1* | 3/2015 | Yun | H04W 36/0083 |
| | | | 455/436 |
| 2015/0111575 A1* | 4/2015 | Lei | H04W 36/08 |
| | | | 455/436 |
| 2016/0165494 A1* | 6/2016 | Warburton | H04L 67/1072 |
| | | | 370/329 |

* cited by examiner

*Primary Examiner* — Brian Roberts
(74) *Attorney, Agent, or Firm* — Patti & Malvone Law Group, LLC

(57) ABSTRACT

Exemplary apparatuses and methods are provided that address how to optimize automatic neighbor relations. Specifically, a base station receives measurements from a mobile terminal connected thereto. The base station determines neighbor relations from the received measurements that includes identifiers of other base stations in neighboring cells detected by the mobile terminal. The base station determines a number of communication links needed to exchange data with the other base stations. The base station prioritizes the neighbor relations from a lowest priority level to a highest priority level before a maximum number of communication links needed to exchange data is exceeded. The base station may delete neighbor relations with the lowest priority level from the base station's Neighbor Relation Table so that the base station can support new neighbor relations, more efficient hand-offs, and improve network performance. The base station may hand-off calls to base stations selected from the prioritized neighbor relations.

18 Claims, 6 Drawing Sheets

FIG. 3A

| PRIORITY LEVEL | DESCRIPTION | DELETION INTERVAL |
|---|---|---|
| 7 | INTRA-FREQUENCY NEIGHBORS HAVE HIGHEST PRIORITY AND LONGEST DELETION INTERVAL | 60 HOURS |
| 4 TO 6 | INTER-FREQUENCY NEIGHBORS AND OTHER BASE STATIONS | 18 TO 48 HOURS |
| 0 TO 3 | LOWEST PRIORITY LEVEL NEIGHBORS HAVE THE SHORTEST DELETION INTERVAL | 3 TO 12 HOURS |

FIG. 3B

NEIGHBOR RELATION TABLE ⟵ 300

| NR | TCI | PRIORITY LEVEL | NO REMOVE | NO HO | NO X2 |
|---|---|---|---|---|---|
| 1 | TCI #1 | 7 | | | |
| 2 | TCI #2 | 6 | OK | | OK |
| 3 ⋮ | TCI #3 | 5 | OK | | |

CARRIER PRIORITY BASED AUTOMATIC NEIGHBORING RELATION OPTIMIZATION

TECHNICAL FIELD

This invention relates to the art of telecommunication systems, and more particularly to optimizing automatic neighbor relations.

BACKGROUND

The Long Term Evolution (LTE) architecture is a standard for wireless communication of high-speed data for mobile phones and data terminals. LTE provides an upgrade path for service providers with both Global System for Mobile Communications (GSM)/Universal Mobile Telecommunications System (UMTS) networks and Code Division Multiple Access 2000 (CDMA 2000) networks. In LTE, a base station, known as an evolved Node B (eNodeB), receives data and signaling information over an air interface from mobile terminals (e.g., smart phones, etc.), referred to as user equipment (UE), that are connected to the eNodeB within a geographical area called a cell. The eNodeB transmits the data and signaling information over a physical medium (e.g., fiber links) to a core network (i.e., network elements independent of the connection technology of the mobile terminal). Also, the eNodeB wirelessly transmits data and signaling information received from the core network to the UEs. Traditionally, a Node B in a UMTS terrestrial radio access network (UTRAN) has minimum functionality, and is controlled by a Radio Network Controller. However, with a LTE eNodeB, there is no separate controller element. This simplifies the architecture and allows lower response times.

In LTE networks, UEs measure the reference signal received power and the reference signal received quality from base stations/eNodeBs. In addition, the UEs will report to the eNodeB to which it connects (i.e., a serving eNodeB) all of the base stations/eNodeBs that it detects in neighboring cells that operate on the same carrier frequency, including neighboring cells that are not part of the eNodeB's Neighbor Relation Table of neighboring cells. Base stations in neighboring cells of a serving base station/serving eNodeB, virtual base stations and distributed base stations are referred to herein as neighbor relations.

After the UEs report identifiers of the other base stations in neighboring cells to the serving eNodeB, the serving eNodeB may automatically update the Neighbor Relation Table to include identifiers of previously unknown neighbor relations, automatically initiate an X2 link to an eNodeB in a neighboring cell, and automatically update the Neighbor Relation Table to include the new X2 link. The X2 link is an interface for connecting neighboring eNodeBs in a peer to peer fashion that allows the eNodeBs to communicate and to perform hand-offs without assistance from the core network. A hand-off is the process in which the radio access network changes the radio transmitters or radio access mode or radio system used to provide the bearer services, while maintaining a defined bearer service quality of service.

There are a fixed number of X2 links that an eNodeB can support. Disadvantageously, in densely populated urban areas that have macro cells (i.e., outdoor base stations with a large cell radius), metro cells (i.e., base stations that are mounted on lamp posts, positioned on the sides of buildings or found indoors in stadiums, transport hubs and other public areas), and femtocells (i.e., small, low-power base stations typically designed for use in a home or small business), UEs may report potential neighbors that exceed the maximum number of X2 links that an eNodeB can support. When X2 links are not added to an eNodeB's Neighbor Relation Table, calls may be dropped and re-established, resulting in degraded network performance.

Also, disadvantageously, since the use of X2 links may result in lower signaling overhead, a lower number of X2 links at an eNodeB may indicate that a network may not be optimized and run efficiently. Further disadvantageously, some neighbor relations and X2 links in an eNodeB's Neighbor Relation Table may not be used. Current solutions purge the neighbor relations and the X2 links that have not been used periodically via a garbage collection mechanism that purges them after a predetermined number of days, which may not be fast enough to prevent network degradation.

SUMMARY

Apparatuses and methods are provided to prioritize neighbor relations at a base station and delete the lowest priority neighbor relations. More specifically, in one embodiment, provided is a method that includes receiving, at a base station, measurements from a mobile terminal connected to the base station; determining, at the base station, identifiers of neighbor relations from the received measurements, wherein the neighbor relations comprise other base stations in neighboring cells detected by the mobile terminal; determining, at the base station, a number of communication links needed to exchange data with the other base stations; and prioritizing, at the base station, the neighbor relations before a maximum number of the communication links needed to exchange the data with the other base stations is exceeded.

In another embodiment, an apparatus is provided that includes a radio frequency (RF) interface configured to receive measurements from a mobile terminal connected to the base station; and at least one processor coupled to the RF interface, the at least one processor being configured to determine identifiers of neighbor relations from the received measurements, wherein the neighbor relations comprise other base stations in neighboring cells detected by the mobile terminal; determine a number of communication links needed to exchange data with the other base stations; and prioritize the neighbor relations before a maximum number of the communication links needed to exchange the data with the other base stations is exceeded.

In another embodiment, a method is provided that includes prioritizing, at a base station, neighbor relations contained in a Neighbor Relation Table of the base station from a highest priority level to a lowest priority level; and deleting, at the base station, the neighbor relations that have the lowest priority level.

In another embodiment, a non-transitory program storage device is provided that has computer readable instructions encoded therein, the computer readable instructions adapted to be executed to implement a method that includes determining identifiers of neighbor relations from measurements received from a mobile terminal, wherein the neighbor relations comprise at least one of base stations, virtual base stations and distributed base stations detected by the mobile terminal; determining a number of communication links needed to exchange data with the neighbor relations; and prioritizing the neighbor relations before a maximum number of the communication links needed to exchange the data with the neighbor relations is exceeded.

DESCRIPTION OF THE DRAWINGS

Some embodiments of apparatuses and methods in accordance with embodiments of the present invention are now described, by way of example only, and with reference to the accompanying drawings, in which:

FIG. 3A shows an illustrative embodiment for an output of a prioritization process arranged in accordance with the principles of the invention;

FIG. 3B shows an illustrative embodiment for a Neighbor Relation Table of an eNodeB arranged in accordance with the principles of the invention;

DETAILED DESCRIPTION

Embodiments are provided that address how to prioritize a base station's (e.g., an eNodeB's) neighbor relations and remove (i.e., delete) low priority neighbor relations from the base station's Neighbor Relation Table.

Figure 1:
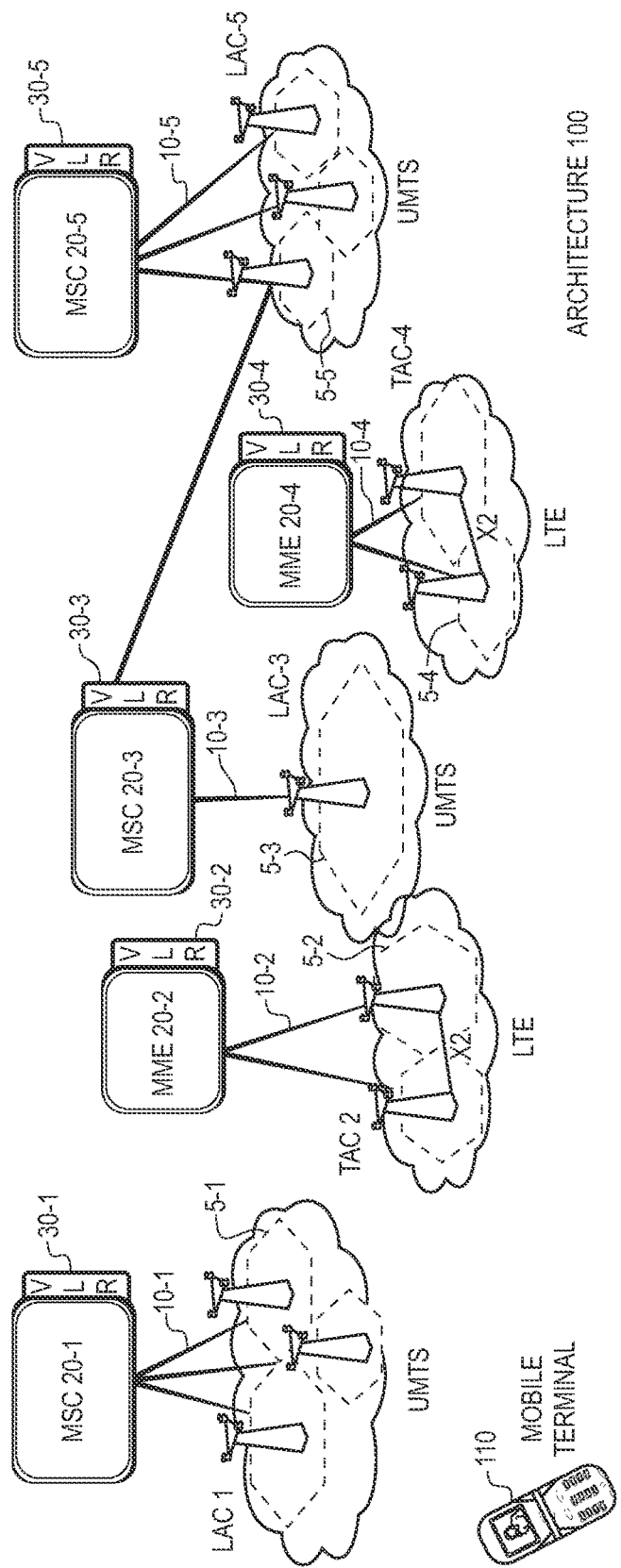
FIG. 1 shows an illustrative embodiment of an exemplary Service Provider network arranged in accordance with the principles of the invention.

FIG. 1 shows an illustrative embodiment of an exemplary Service Provider network arranged in accordance with the principles of the invention. As shown in FIG. 1, architecture 100 includes switches 20-1 to 20-5 (collectively hereinafter referred to as switches 20) that connect to radio transmitters/receivers 5-1 to 5-5 (collectively hereinafter referred to as radio transmitters/receivers 5) over links 10-1 to 10-5 (collectively hereinafter referred to as links 10). Mobile terminal 110 is wirelessly connected to one of radio transmitters/receivers 5. The number of elements illustrated in FIG. 1 is provided for simplicity. FIG. 1 is shown as representative of a portion of a telecommunications network in order to simplify the description of the present invention, while still presenting the subject matter so that it may be completely understood by one of ordinary skill in the art.

Switches 20 perform communication session set up and tear down and convey calls or messages between a plurality of endpoints (e.g., calls from mobile devices to other mobile devices). Switches 20 may have call control components, not shown, that monitor all mobile terminal (i.e., a mobile or handheld device that incorporates wireless voice communication capability as a standard function) calls within their serving area, arranges hand-offs between switches, keeps track of billing information, etc. In one embodiment, switches 20 may comprise a mobile switching center (e.g., MSC 20-1, MSC 20-3 and MSC 20-5) that serves a Universal Mobile Telecommunications System (UMTS) network (e.g., location area code 1 (LAC 1), LAC 3 and LAC 5). In another embodiment, switches 20 may comprise a Mobility Management Entity (e.g., MME 20-2 and MME 20-4) that serves a Long Term Evolution (LTE) network (e.g., tracking area code 2 (TAC 2) and TAC 4). In yet another embodiment, not shown, switches 20 may comprise Serving General Packet Radio Service Support Nodes that serve a Global System for Mobile Communications (GSM) network. The functions of telecommunication switches are well known in the art, and will not be described in detail.

Each of switches 20 are associated with their own visitor location registers (VLRs) (i.e., VLRs 30-1 to 30-5, collectively hereinafter referred to as VLRs 30). In one illustrative embodiment, each of switches 20 is integrated with their own VLR (e.g., MSC 20-1 is integrated with VLR 30-1 and MME 20-2 is integrated with VLR 30-2, etc). In another embodiment, not shown, the VLR may be very tightly linked with the switch via a proprietary interface. VLRs 30 are databases that contain information about the subscribers roaming within a location area of switches 20. Whenever a mobile terminal enters an area served by VLRs 30 and registers there, VLRs 30 inform the subscriber's home location register (HLR), not shown, of the change in the mobile terminal's location. The HLR downloads the subscription profile (i.e., a record of the subscriber name, telephone number, address, account status and telephone features subscribed to) of the roaming subscriber as well as other information necessary for call termination at the mobile terminal to VLRs 30. VLRs 30 monitor the mobile terminal's location while the mobile terminal is within the coverage area of VLRs 30. Illustratively, VLR 30-1 monitors a mobile terminal's location while the mobile terminal is within LAC-1 and VLR 30-2 monitors a mobile terminal's location while the mobile terminal is within TAC-2. A subscriber' mobile terminal cannot be present in more than one VLR at a time.

Also, each of switches 20 are connected to one or more radio transmitters/receivers 5 that provide bi-directional wireless connectivity for wireless communication devices (e.g., "pocket" mobile phones, mobile telephones installed in an engine-driven vehicle, smart phones, personal digital assistance (PDA) devices, a digital video camera that can access the Internet, two-way pagers, notebook computers, wireless portable media players that allow an addition of executable programs, or other portable devices with the capability to connect and interact with a wireless network) within a geographical area, or a cell. A cell is a basic geographic unit of a cellular system, and radio transmitters/receivers 5 may be positioned at or near the center of a cell in one of LAC 1, LAC 3, LAC 5, TAC 2 and TAC 4. Illustratively, radio transmitters/receivers 5-1 are centrally situated within a cell of LAC 1 and radio transmitters/receivers 5-2 are centrally situated within a cell of TAC 2. Two cells are neighbors if their service areas overlap. Architecture 100 may include a much larger number of cells in actual practice, but a small number of cells is depicted in FIG. 1 for the sake of simplicity.

In one illustrative embodiment, radio transmitters/receivers 5 comprise base stations in a UMTS terrestrial radio access network, referred to as UTRAN, (e.g., radio transmitters/receivers 5-1, radio transmitters/receivers 5-3 and radio transmitters/receivers 5-5). In another illustrative embodiment, radio transmitters/receivers 5 comprise eNodeBs in a LTE network (e.g., radio transmitters/receivers 5-2 and radio transmitters/receivers 5-4). Within TAC 2, eNodeBs 5-2 are connected by X2 links that allow the eNodeBs to exchange data and perform hand-offs without the assistance of MME 20-2. Similarly, within TAC 4, eNodeBs 5-4 are connected by X2 links that allow the eNodeBs to exchange data and perform hand-offs without the assistance of MME 20-4. Each of radio transmitters/receivers 5 may have an integrated antenna or be connected to an antenna by feeder cables.

In yet another illustrative embodiment, not shown, radio transmitters/receivers 5 may include virtual base stations and distributed base stations, which may comprise one or more virtual machines running different software and processes, on top of standard high-volume servers, switches and storage, or even cloud computing infrastructure, instead of or in addition to having custom hardware devices. The virtual base stations and distributed base stations may be embedded in the service provider's network core, metro, edge and in the end user premises based on feasibility, performance, cost, and policy.

Radio transmitters/receivers 5 comprise a radio access network and switches 20 comprise a core network. Links 10, located between radio transmitters/receivers 5 and switches 20, may encompass optical links, wireless links, packet switched channels, direct communication channels, microwave, Ethernet or any combination thereof depending on the needed capacity and expense.

Figure 2:
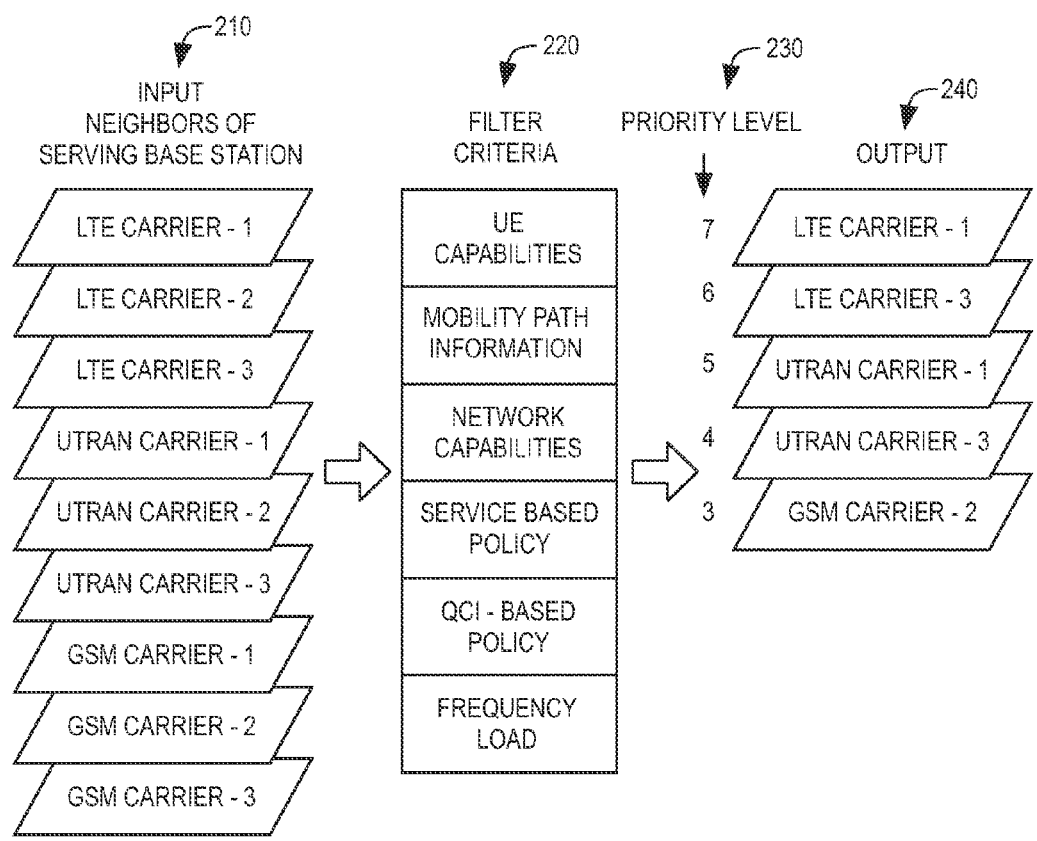
FIG. 2 shows an illustrative embodiment for a prioritization of neighbor relations arranged in accordance with the principles of the invention.

FIG. 2 shows an illustrative embodiment for a prioritization of neighbor relations arranged in accordance with the principles of the invention.

For purposes of illustration and example, when a mobile terminal is powered on, the mobile terminal may measure the received power and the received quality of base stations that it detects. The mobile terminal may wirelessly connect to the base station with the strongest signal consistent with the mobile terminal subscriber's subscription profile. For example, if the mobile terminal supports multi-mode operation (i.e., a UE that can obtain service from at least two different types of radio systems, such as LTE, UTRAN, GSM, etc.), the mobile terminal may detect one or more base stations that may include one or more LTE eNodeBs, one or more UTRAN base stations, and one or more GSM base stations, etc. The mobile terminal may measure the signal strength of each of these base stations and detect that each one has different signal strengths. A GSM subscriber's subscription profile may allow the GSM subscriber's mobile terminal to connect to one of the GSM base stations. However, a LTE subscriber's subscription profile may allow the LTE subscriber's mobile terminal to connect to a LTE eNodeB, a UTRAN base station or a GSM base station.

Illustratively, when the mobile terminal connects to an eNodeB (i.e., the serving eNodeB), the serving eNodeB may gather several critical pieces of data from the mobile terminal to adapt and modify its downlink (i.e., unidirectional radio link for the transmission of signals from a base station to a user equipment) transmission. For example, the mobile terminal may report to the serving eNodeB the current channel condition. Also, the mobile terminal may report to the serving eNodeB one or more identifiers (e.g., Physical Cell Identifier (PCI), E-UTRAN Cell Global Identifier (ECGI), Cell Global Identity (CGI), tracking area codes, etc.) of all of the base stations that it detects in the neighboring cells that operate on the same frequency as the serving eNodeB, including base stations that are not part of the serving eNodeB's Neighbor Relation Table of neighboring cells. An eNodeB and other eNodeBs that operate on the same frequency band are referred to as LTE intra-frequency neighbors. Conversely, eNodeBs that do not operate on the same frequency band are referred to as LTE inter-frequency neighbors. Periodically, the serving eNodeB may direct the mobile terminal to measure the received power and the received quality of all of its inter-frequency neighbors, which requires the eNodeB to inform the mobile terminal of which frequencies to measure.

Also illustratively, the mobile terminal may report to the serving eNodeB the detection of three eNodeBs (i.e., LTE carrier-1, LTE carrier-2, LTE carrier-3), three UTRAN base stations (i.e., UTRAN carrier-1, UTRAN carrier-2, UTRAN carrier-3), and three GSM base stations (i.e., GSM carrier-1, GSM carrier-2, GSM carrier-3) that are located in the neighboring cells, as shown in Input 210 of FIG. 2. The detected base stations may include known and new (i.e., unknown) base stations. The serving eNodeB maintains a record of its known neighbor relations in its Neighbor Relation Table of neighboring cells. The serving eNodeB may check to determine if identifiers of the detected base stations are already included in its Neighbor Relation Table. Consequently, the identifiers of one or more of the detected three eNodeBs, the identifiers of one or more of the detected three UTRAN base stations, and the identifiers of one or more of the detected three GSM base stations may be included in the Neighbor Relation Table.

Further illustratively, the serving eNodeB may utilize an Automatic Neighbor Relations feature to dynamically add the identifiers of unknown base stations to the Neighbor Relation Table and remove (i.e., delete) the identifiers of outdated neighbor relations from the Neighbor Relation Table. In addition, the serving eNodeB may utilize the Automatic Neighbor Relations feature to determine the number of additional communication links (e.g., X2 link) needed to exchange data and messages with one or more of the detected base stations so that the serving eNodeB may perform hand-offs to the base stations without assistance from the core network, perform load management, etc. The communication links may be logical connections (i.e., over an existing transport network) or physical connections (i.e., direct connections) between the base stations. The serving eNodeB may establish the additional communication links to one or more of the other base stations when needed.

In one embodiment, prior to exceeding a maximum number of neighbor relations and a maximum number of communication links (e.g., 160 communication links) with other base stations that a serving base station (e.g., a serving eNodeB) can support, the serving base station may prioritize the neighbor relations and their associated communication links in the Neighbor Relation Table and delete the lowest priority level neighbor relations and their associated communication links to accommodate the addition of new neighbor relations and their associated communication links. Specifically, a service provider may configure a serving base station to automatically prioritize every neighbor relation in the serving base station's Neighbor Relation Table based on filter criteria that depicts how the network is configured. As shown in FIG. 2, the Filter Criteria 220 may include parameters such as a) UE capabilities (e.g., frequency bands supported, features supported by the UE, radio access technologies supported, etc.), b) mobility path information (i.e., UE history information that includes Global cell ID, cell Type, and the time that the UE stayed in a cell for the 16 last visited cells)—used by a base station to proactively predict the neighbor cell to which the UE will handover and to optimize signaling message exchanges, c) network capabilities (i.e., includes network support for features and capabilities like Voice over LTE, Carrier Aggregation, Packet Switched Handover, etc.), d) service based policy, e) Quality of Service Class Indicator (QCI)-based policy (i.e., QCI ranges from 1 to 9 and includes parameters to define Bit-Rate, Priority, Delay Budget and Packet Error rate), and f) frequency load (i.e., load balancing and load control for certain events, such as concerts). A service provider may configure the serving base station to automatically apply each of the parameters that comprise the Filter Criteria 220 individually or in combination to prioritize the neighbor relations.

More specifically, a service provider may configure a serving base station to assign every neighbor relation in the serving base station's Neighbor Relation Table a priority level based on a first filter criteria, in which some frequency bands are preferred over other frequency bands. Illustratively, a serving eNodeB's intra-frequency neighbors may be preferred over inter-frequency neighbors. In another embodiment, a service provider may configure a serving base station to assign every neighbor relation in the serving base station's Neighbor Relation Table a priority level based on a second filter criteria, in which some radio access technologies are preferred over other radio access technologies. Illustratively, a serving eNodeB's LTE eNodeB neighbors may be preferred over UTRAN neighbors and GSM neighbors. Also illustratively, a serving eNodeB's UTRAN neighbors may be preferred over GSM neighbors. In yet another embodiment, a service provider may configure a serving base station to assign every neighbor relation in the serving base station's Neighbor Relation Table a priority level based on a third filter criteria, in which some frequency bands and some radio access technologies are preferred over other frequency bands and other radio access technologies. Illustratively, a serving eNodeB's LTE intra-frequency neighbors may be preferred over LTE inter-frequency neighbors and neighbors that utilize a different radio access technology. Also illustratively, a serving eNodeB's LTE inter-frequency neighbors may be preferred over neighbors that utilize a different radio access technology.

The outcome of the filtering process is a prioritized list of the neighbor relations (e.g., Priority Levels 230) that ranges from a highest priority level (e.g., seven) to a lowest priority level (e.g., zero). As shown in the Output 240 of FIG. 2, the lowest priority level neighbor relations and their associated communication links to the serving base station may be deleted by the serving base station so that the serving base station can support new neighbor relations, more efficient hand-offs, and improve network performance. The prioritized list minus the deleted lowest priority level neighbor relations and their associated communication links may be stored in the serving base station's Neighbor Relation Table.

Furthermore, depending on the capacity of the cell, the load (e.g., number of connected users in the cell), traffic type (e.g., voice call, streaming video, web surfing or data download/upload), UE subscription profile, UE capability Information and UE history information, the eNodeB may redirect the mobile terminal to be on a specific base station for a hand-off. Illustratively, a subscriber using the mobile terminal for a voice call may be placed on UTRAN carrier-1 shown in FIG. 2. Also illustratively, a subscriber streaming music or video may be placed on LTE carrier-1. Further illustratively, a subscriber using the mobile terminal to look at a web page may be placed on LTE carrier-3. Further still illustratively, an idle mobile terminal may be placed on GSM carrier-3. This is a way for the network to manage and direct traffic in the radio access network efficiently.

FIG. 3A shows an illustrative embodiment for an output of a prioritization process arranged in accordance with the principles of the invention.

As shown in FIG. 3A, priority level 7, which is the highest priority level, is reserved for base stations that are intra-frequency neighbors. This is because when a mobile terminal connects to a serving base station, the mobile terminal will measure only the carrier frequency of the serving base station. Hence, that carrier frequency and neighboring base stations that operate on that same frequency receive the highest priority level. Thus, intra-frequency neighbors are preferred over other neighbor relations, and neighbor relations for intra-frequency neighbors may exist in the Neighbor Relation Table for the longest time intervals (e.g., 60 hours).

In one embodiment, neighbor relations with priority levels of 4 to 6 may include LTE systems that are inter-frequency, as well as other detected base stations in neighboring cells. Neighboring LTE inter-frequency may have a higher priority level than neighboring base stations that utilize a different radio access technology. Illustratively, if the mobile terminal is connected to a serving eNodeB, then the serving eNodeB's inter-frequency neighbors would have a higher priority level than a neighboring UTRAN base station or a neighboring GSM base station because the mobile terminal does not have to switch radio access technology to measure the carrier frequencies. These neighbor relations may be deleted in 18 to 48 hours.

Neighbor relations with the lowest priority levels (i.e., 0 to 3) based on the filter criteria may be deleted from the Neighbor Relation Table first (e.g., 3 to 12 hours), effectively introducing a tiered system based on carrier priority to determine which neighbor relations to delete. Low priority level neighbor relations are deleted rather than high priority level neighbor relations that are not being used. The time interval for deleting neighbor relations may be customized.

FIG. 3B shows an illustrative embodiment for a Neighbor Relation Table of an eNodeB arranged in accordance with the principles of the invention. Although only three neighbor relations are shown in FIG. 3 B, there may be multiple neighbor relations in a Neighbor Relation Table. The number of neighbor relations illustrated in FIG. 3B is provided to simplify the description of the present invention.

An existing neighbor relation from a source cell to a target cell means that the eNodeB controlling the source cell (i.e., the serving eNodeB): a) knows the ECGI/CGI and PCI of the target cell, b) has an entry in the Neighbor Relation Table for the source cell identifying the target cell, and c) has the attributes in this Neighbor Relation Table entry defined. Specifically, the Neighbor Relation Table 300 contains, for each neighbor relation (NR) numbered from 1 to 3, the Target Cell Identifier (TCI) which identifies the target cell. For E-UTRAN, the TCI corresponds to the ECGI and PCI of the target cell. For each target cell identifier, three attributes may be set: No Remove, No HO, and No X2. The first attribute, No Remove, stipulates that the eNodeB shall not remove the neighbor relation from the Neighbor Relation Table 300. The second attribute, No HO, stipulates that the neighbor relation shall not be used by the eNodeB for handovers/hand-offs. The third attribute, No X2, stipulates that the neighbor relation shall not use an X2 interface in order to initiate procedures towards the eNodeB parenting the target cell. In one embodiment the present invention adds the assigned Priority Level of the neighbor relation to the Neighbor Relation Table 300 as shown in FIG. 3B.

Figure 4:
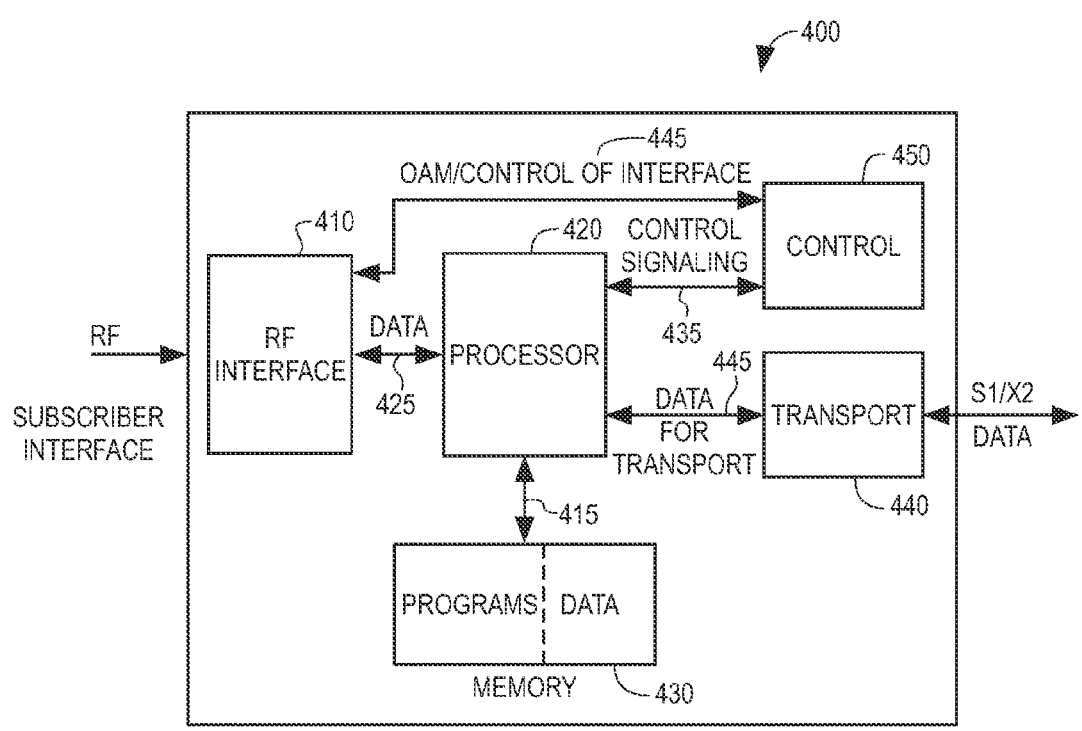
FIG. 4 shows an illustrative embodiment for an exemplary functional architecture of a base station (e.g., an eNodeB) arranged in accordance with the principles of the invention.

FIG. 4 shows another illustrative embodiment for an exemplary functional architecture of a base station (e.g., an eNodeB) arranged in accordance with the principles of the invention. The various elements depicted in FIG. 4 may be implemented using any combination of hardware, software, or firmware using known techniques in accordance with the teachings herein. Also, the various elements illustrate an exemplary configuration and partition of functions. Furthermore, an exemplary component of FIG. 4 employs and/or comprises a set and/or series of computer instructions written in or implemented with any of a number of programming languages, as will be appreciated by those skilled in the art. Further still, the various elements may be implemented in a centralized manner having all of the elements within a single physical device, or in a distributed manner in which the various elements are housed in separate physical devices. As shown in FIG. 4, eNodeB 400 comprises Processor 420 which connects to radio frequency (RF) interface 410 via link 425, Memory 430 via link 415, Transport 440 via link 445, and Control 450 via link 435.

Radio frequency (RF) interface 410 is an air interface device configured to receive signaling information and data from mobile terminals connected to the eNodeB 400, and to send the data to Processor 420. In addition, RF interface 410 is configured to send signaling information and data received from the core network (e.g. a Mobility Management Entity) to mobile terminals connected to the eNodeB 400. RF interface 410 is configured to support high data rates, lower latency and is optimized for packet data. When a mobile terminal is powered on, eNodeB 400 is responsible for Radio Resource Management, (i.e. it shall do the radio bearer control, radio admission control, allocation of uplink and downlink to the mobile terminal) via RF interface 410. RF interface 410 may be implemented as one or more transmitters and one or more receivers capable of supporting a large number of frequency bands and modes of operation.

Processor 420 is configured to receive and process instructional information and to perform functions necessary for eNodeB 400 to obtain data and manage mobile terminal connected thereto. Specifically, Processor 410 may execute program logic to a) determine identifiers of neighbor relations from measurements received from mobile terminals, b) determine a number of communication links (e.g., X2 links) needed to exchange data and messages with other base stations (e.g., eNodeBs), c) establish the communication links to the other base stations (e.g., eNodeBs), d) prioritize the neighbor relations based on filter criteria before a maximum number of communication links needed to exchange data with other base stations is exceeded by assigning a priority level to the neighbor relations from a highest priority level to a lowest priority level, e) update a Neighbor Relation Table to delete the neighbor relations with the lowest priority level within a first time interval after prioritization, f) update the Neighbor Relation Table to include unknown base stations, g) direct the mobile terminals to measure the received power and the received quality of neighbor relations selected from a prioritized list based on their priority level, h) instruct a transmitter (e.g., Transport 440) to send hand-off requests to other base stations in the neighboring cells based on the priority level of the base stations, and i) hand-off calls to other base stations in the neighboring cells.

Processor 420 may be any type of processor capable of manipulating data and performing the functions described herein for an eNodeB. Processor 420 should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM) for storing software, and non volatile storage. The functions of Processor 420 may be provided by a single dedicated processor, by a single shared processor, or by a plurality of individual processors, some of which may be shared.

Memory 430 may contain memory locations for storing information (e.g., the Neighbor Relations Table) and instructions for Processor 420, including the software modules that facilitate the overall functionality of eNodeB 400. Processor 420 reads information and instructions from, and writes information to Memory 430.

Memory 430 may be any type of device capable of storing information. Memory 430 may be embodied as random access memory (RAM), read only memory (ROM), magnetic disk drive storage media, optical storage media, flash memory drives, on-board memory included within Processor 420, Erasable Programmable ROM (EPROM), Electrically Erasable Programmable ROM (EEPROM), registers, non-transitory storage for holding program instructions, or any combination thereof.

Transport 440 are transmitter/receiver devices that may be used to access particular types of network elements with which eNodeB 400 wishes to communicate. Illustratively, Transport 440 may receive signaling information and data from RF interface 410 and forward them to the core network (e.g. a Mobility Management Entity) over a S1 interface. Also illustratively, Transport 440 may send signaling information and data from the core network to RF interface 410. Further illustratively, Transport 440 may act upon instructions from Processor 420 to send hand-off messages to base stations in neighboring cells over an X2 interface. In one embodiment Processor 420 may instruct Transport 440 to send the hand-off messages for calls to the target base stations in the neighboring cells using a logical connection or a physical connection between eNodeB 400 and the target base stations. An antenna, not shown, may be electronically coupled to Transport 440.

Control 450 provides operations, administrative & maintenance (OAM) functions. Control 450 exchanges signaling information with Processor 420 via link 435. Also, Control 450 provides control signals to RF Interface 410 via link 445.

Advantageously, the methods according to an embodiment of the invention enable service providers to prioritize neighbor relations and add better communication links (e.g., X2 links) between base stations for more efficient hand-offs. Also advantageously, in an embodiment of the invention deletion of neighbor relations may be performed based on assigned priority levels rather than usage of a neighbor relation and/or associated communication links between base stations. Further advantageously, in an embodiment of the invention deletion of low priority neighbor relations may be performed in hours rather than a predetermined number of days.

Figure 5:
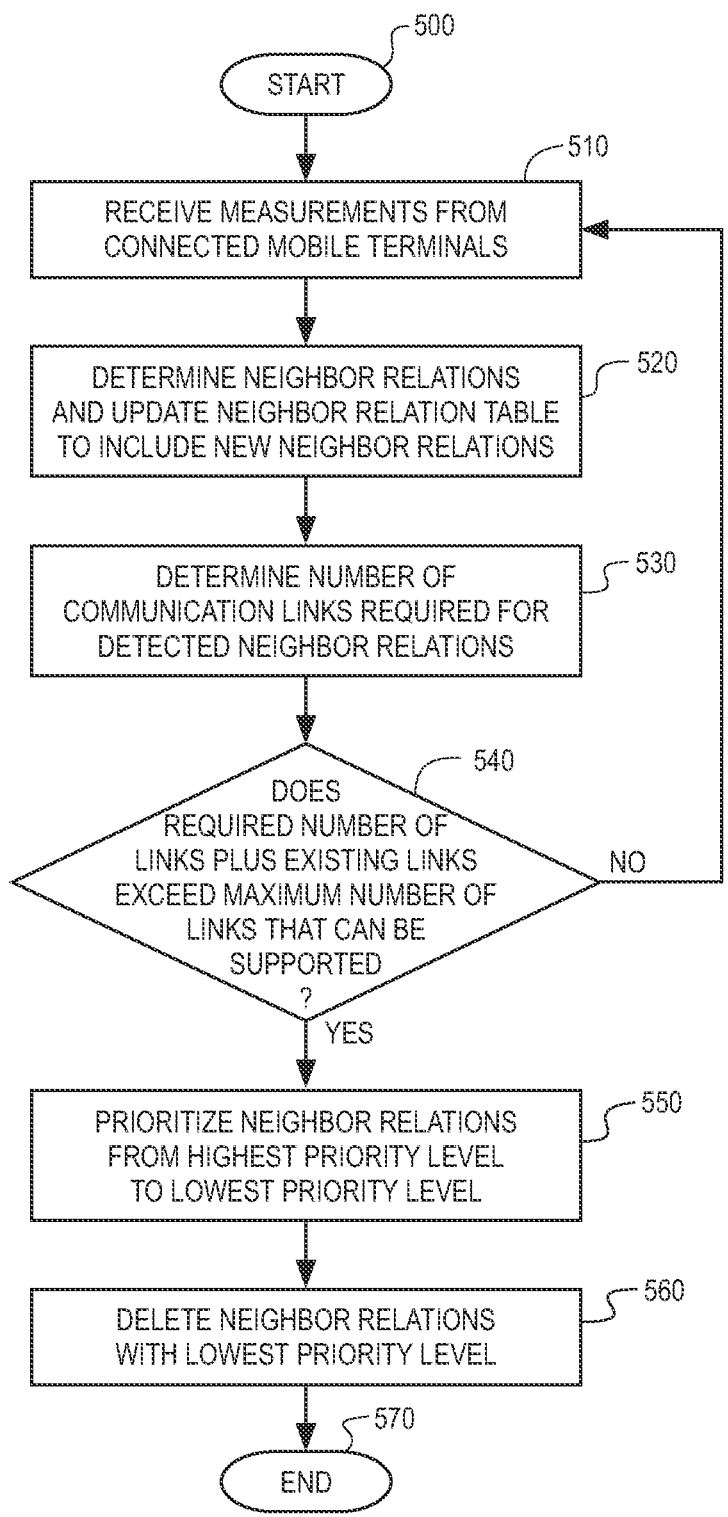
FIG. 5 shows an illustrative flow chart for an exemplary method of operating an embodiment of the invention arranged in accordance with the principles of the invention.

FIG. 5 shows an illustrative flow chart for an exemplary method of operating an embodiment of the invention arranged in accordance with the principles of the invention. FIG. 5 focuses on the operation of prioritizing the base station's (e.g., eNodeB's) neighbor relations and deleting the lowest priority neighbor relations. The process begins in step 500 (FIG. 5).

In step 510 (FIG. 5), RF interface 410 (FIG. 4) within eNodeB 400 receives measurements from one or more mobile terminals (FIG. 1) wirelessly connected to eNodeB 400. The measurements include signal strengths and signal quality of base stations that the one or more mobile terminals detect. Also, the measurements may include identifiers of the detected neighboring cell/base stations. RF interface 410 (FIG. 4) sends the data to Processor 420 on link 425.

In step 520 (FIG. 5), one or more processors 420 (FIG. 4) within eNodeB 400 execute program logic to determine neighbor relations associated with eNodeB 400 based on the measurements. Specifically, one or more processors 420 a) determine whether identifiers (e.g., ECGIs, PCIs, etc.) of the detected base stations are in eNodeB 400's Neighbor Relation Table (FIG. 3B) and b) update the Neighbor Relation Table with the identifiers of the new (i.e., unknown) neighbor relations.

In step 530 (FIG. 5), the one or more processors 420 (FIG. 4) execute program logic to determine the number of communication links (e.g., X2 links) needed to exchange data with the detected base station neighbors and attempt to establish new communication links (e.g., X2 links) with the detected base station neighbors (e.g., eNodeB), particularly to detected base stations that are not included in eNodeB 400's Neighbor Relation Table (FIG. 3B). The communication links may be a logical connection or a physical connection between eNodeB 400 and at least one of the other detected base stations.

In step 540 (FIG. 5), the one or more processors 420 (FIG. 4) execute program logic to determine whether the number of required communication links (e.g., X2 links) needed to exchange data with the detected base stations plus the existing number of communication links exceed the maximum number of communication links (e.g., X2 links) that eNodeB 400 can support.

If the test result in step 540 (FIG. 5) is NO, indicating that the number of required communication links (e.g., X2 links) needed to exchange data with the detected base stations plus the existing number of communication links does not exceed the maximum number of communication links (e.g., X2 links) that eNodeB 400 can support, then control is passed to step 510.

If the test result in step 540 (FIG. 5) is YES, indicating that the number of required communication links (e.g., X2 links) needed to exchange data with the detected base stations plus the existing number of communication links does exceed the maximum number of communication links (e.g., X2 links) that eNodeB 400 can support, then control is passed to step 550.

In step 550 (FIG. 5), the one or more processors 420 (FIG. 4) execute program logic to prioritize the neighbor relations using the filter criteria (FIG. 2). In one embodiment, a service provider may configure a serving base station to automatically assign every neighbor relation in the serving base station's Neighbor Relation Table (FIG. 3B) a priority level based on filter criteria, such as some frequency bands and some radio access technologies being preferred over other frequency bands and other radio access technologies. The priority levels may range from zero to seven, with zero being the lowest priority level and seven being the highest priority level. The highest priority level may be reserved for intra-frequency neighbors. The filter criteria excludes usage of the communication links between the serving base station and the neighboring stations.

In step 560 (FIG. 5), the one or more processors 420 (FIG. 4) execute program logic to delete the neighbor relations with the lowest priority by updating the Neighbor Relation Table (FIG. 3B) to indicate the deletion of the lowest priority neighbor relations. Also, the one or more processors 420 delete any communication links between eNodeB 400 and the deleted neighbor relations. The Neighbor Relation Table may be stored in Memory 430.

The process is exited in step 570.

Figure 6:
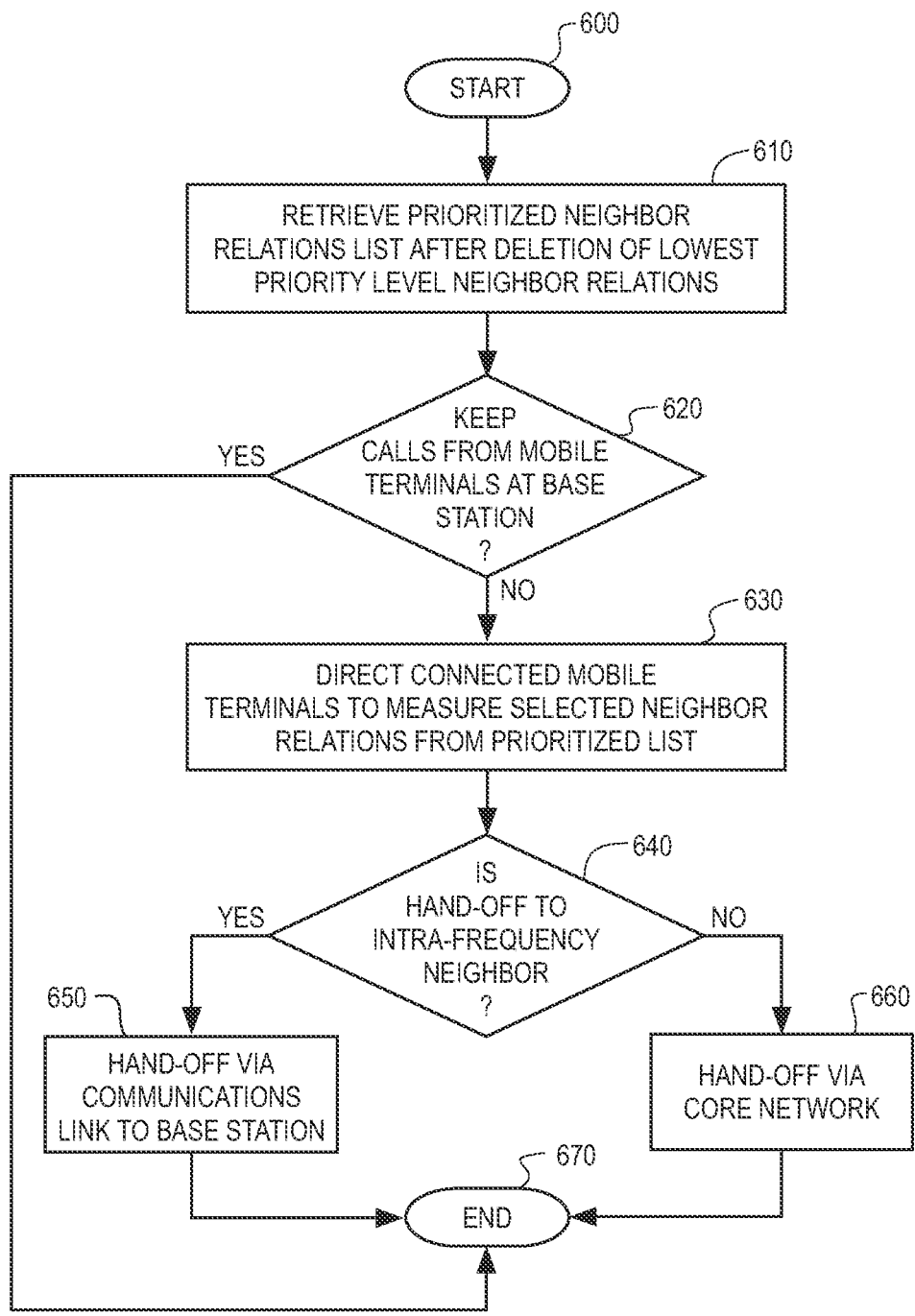
FIG. 6 shows another illustrative flow chart for another exemplary method of operating an embodiment of the invention arranged in accordance with the principles of the invention.

FIG. 6 shows another illustrative flow chart for an exemplary method of operating an embodiment of the invention arranged in accordance with the principles of the invention. FIG. 6 focuses on the operation of using the prioritized neighbor relations list for hand-off decisions. The process begins in step 600 (FIG. 6).

In step 610 (FIG. 6), one or more processors 420 (FIG. 4) within eNodeB 400 execute program logic to retrieve the prioritized neighbor relations list after deletion of the lowest priority level neighbor relations from the Neighbor Relations Table (FIG. 3B) stored in Memory 430 via link 415.

In step 620 (FIG. 6), one or more processors 420 (FIG. 4) execute program logic to determine whether eNodeB 400 will keep the calls from the one or more mobile terminals (FIG. 1) or hand-off the calls from the one or more mobile terminals to a base station in a neighboring cell. In one embodiment, the calls may be handed-off because the mobile terminals are moving away from the area covered by one cell and entering the area covered by another cell, so the call is transferred to the second cell in order to avoid call termination when the mobile terminals get outside the range of the first cell. In another embodiment, when the capacity for connecting new calls of a given cell is used up and an existing or new call from a phone, which is located in an area overlapped by another cell, is transferred to that cell in order to free-up some capacity in the first cell for other users, who can only be connected to that cell.

If the test result in step 620 (FIG. 6) is YES, indicating that eNodeB 400 will keep the calls from one or more mobile terminals (FIG. 1), then control is passed to step 670.

If the test result in step 620 (FIG. 6) is NO, indicating that eNodeB 400 will not keep the calls from the one or more mobile terminals (FIG. 1), then control is passed to step 630.

In step 630 (FIG. 6), one or more processors 420 (FIG. 4) execute program logic to direct one or more of the connected mobile terminals (FIG. 1) to measure the signal strength and signal quality of selected neighbor relations from the prioritized list (FIG. 3B) that excludes the lowest priority level neighbor relations, so that eNodeB 400 can hand-off the calls to one of the selected neighbor relations from the prioritized list. In essence, the one or more of the connected mobile terminals (FIG. 1) will provide measurements of the base stations that eNodeB 400 wants rather than measurements of all base stations as detected by the mobile terminal. The choice of a particular base station for a hand-off of the calls is based on the priority level of the neighbor relations rather than the signal strength of the neighboring cells as detected by the one or more mobile terminals.

In step 640 (FIG. 6), one or more processors 420 (FIG. 4) execute program logic to determine whether the hand-off of the calls will be to an intra-frequency neighbor. Intra-frequency neighbors have the highest priority level and may be the first choice in a hand-off decision.

If the test result in step 640 (FIG. 6) is YES, indicating that the hand-off of the calls will be made to an intra-frequency neighbor, then control is passed to step 650.

In step 650 (FIG. 6), one or more processors 420 (FIG. 4) execute program logic to select the target cell identifier for the hand-off and one or more processors 420 instructs Transport 440 via link 445 to use a communication link (e.g., X2 link) (FIG. 1) associated with the intra-frequency neighbor to issue a hand-off request message to the target intra-frequency neighbor for the hand-off.

If the test result in step 640 (FIG. 6) is NO, indicating that the hand-off of the calls will not be made to an intra-frequency neighbor, then control is passed to step 660.

In step 660 (FIG. 6), the core network (e.g., Mobility Management Entity) (FIG. 1) performs the hand-off.

The process is exited in step 670.

A person of ordinary skill in the art would readily recognize that steps of various above-described methods can be performed by programmed computers. Herein, some embodiments are intended to cover program storage devices, e.g., field-programmable gate arrays (FPGA) and digital data storage media, which are machine or computer-readable and encode machine-executable or computer-executable programs of instructions where said instructions perform some or all of the steps of methods described herein. The program storage devices may be digital memories, magnetic storage media such as magnetic disks or tapes, hard drives, non-transitory storage for holding program instructions, or optically readable digital data storage media. The program storage devices can also be distributed over network-coupled computer systems so that the computer readable code is stored and executed in a distributed fashion. The embodiments are also intended to cover computers programmed to perform said steps of methods described herein.

The steps or operations described herein are intended as examples. There may be many variations to these steps or operations without departing from the spirit of the invention. For instance, the steps may be performed in a different order, or steps may be added, deleted, or modified.

The present invention may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method, comprising:
   receiving, at a base station, measurements from a mobile terminal connected to the base station;
   determining, at the base station, identifiers of neighbor relations from the received measurements, wherein the neighbor relations comprise other base stations in neighboring cells detected by the mobile terminal;
   determining, at the base station, a number of communication links needed to exchange data with the other base stations;
   prioritizing, at the base station, the neighbor relations before a maximum number of the communication links needed to exchange the data with the other base stations is exceeded, wherein the prioritizing comprises assigning a priority level to the neighbor relations from a highest priority level to a lowest priority level based on filter criteria, and wherein the filter criteria comprises frequency bands and radio access technologies supported by the mobile terminal;
   directing, at the base station, the mobile terminal to measure selected ones of the neighbor relations associated with priority levels other than the lowest priority level; and
   performing, at the base station, a hand-off of calls from the mobile terminal to one of the selected ones of the neighbor relations excluding the neighbor relations with the lowest priority level.

2. The method of claim 1, wherein the highest priority level is reserved for intra-frequency neighbors.

3. The method of claim 1, wherein inter-frequency neighbors have a higher priority level than neighbor relations that utilize a radio access technology different from that of the base station.

4. The method of claim 1, further comprising deleting, at the base station, the neighbor relations with the lowest priority level within a first time interval after prioritization.

5. The method of claim 4, further comprising deleting, at the base station, communication links between the base station and the deleted neighbor relations.

6. The method of claim 1, wherein the filter criteria excludes usage of the communication links needed to exchange the data with the other base stations.

7. The method of claim 1, wherein the hand-off is made to the one of the selected ones of the neighbor relations using at least one of the communication links.

8. A non-transitory program storage device having computer readable instructions encoded therein, said computer readable instructions adapted to be executed to implement the method of claim 1.

9. The method of claim 1, wherein an intra-frequency neighbor is a first choice as the one of the selected ones of the neighbor relations for the hand-off of the calls.

10. The method of claim 9, further comprising using, at the base station, a communication link between the base station and the intra-frequency neighbor to issue a hand-off request message to the intra-frequency neighbor for the hand-off of the calls.

11. A base station, comprising:
    a radio frequency (RF) interface configured to receive measurements from a mobile terminal connected to the base station; and
    at least one processor coupled to the RF interface, the at least one processor being configured to
        determine identifiers of neighbor relations from the received measurements, wherein the neighbor relations comprise other base stations in neighboring cells detected by the mobile terminal;
        determine a number of communication links needed to exchange data with the other base stations; and
        prioritize the neighbor relations before a maximum number of the communication links needed to exchange the data with the other base stations is exceeded;
    wherein the at least one processor is configured to assign a priority level to the neighbor relations from a highest priority level to a lowest priority level based on filter criteria, and wherein the filter criteria comprises frequency bands and radio access technologies supported by the mobile terminal; and
    wherein the at least one processor is configured to direct the mobile terminal to measure selected ones of the neighbor relations associated with priority levels other than the lowest priority level; and
    wherein the at least one processor is configured to hand-off calls from the mobile terminal to one of the selected ones of the neighbor relations excluding the neighbor relations in the lowest priority level.

12. The base station of claim 11, wherein the highest priority level is reserved for intra-frequency neighbors.

13. The base station of claim 11, wherein inter-frequency neighbors have a higher priority level than neighbor relations that utilize a radio access technology different from that of the base station.

14. The base station of claim 11, wherein the at least one processor is configured to update a Neighbor Relation Table to delete the neighbor relations with the lowest priority level within a first time interval after prioritization.

15. The base station of claim 11, further comprising a transmitter coupled to the at least one processor, the transmitter being configured, after receipt of instructions from the at least one processor, to send a hand-off request to the one of the selected ones of the neighbor relations using at least one of the communication links.

16. The base station of claim 15, wherein an intra-frequency neighbor is a first choice as the one of the selected ones of the neighbor relations for the hand-off of the calls.

17. The base station of claim 11, further comprising at least one memory component coupled to the at least one processor, the at least one memory component being configured to store instructions executed by the at least one processor.

18. The base station of claim 11, wherein the filter criteria excludes usage of the communication links needed to exchange the data with the other base stations.

* * * * *